(12) United States Patent
Suzuki et al.

(10) Patent No.: US 7,963,101 B2
(45) Date of Patent: Jun. 21, 2011

(54) EXHAUST GAS PURIFYING DEVICE FOR AN INTERNAL COMBUSTION ENGINE

(75) Inventors: Norio Suzuki, Saitama (JP); Nobuhiro Komatsu, Saitama (JP); Tomoko Morita, Saitama (JP); Hisao Haga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 877 days.

(21) Appl. No.: 11/981,358

(22) Filed: Oct. 31, 2007

(65) Prior Publication Data

US 2008/0120964 A1    May 29, 2008

(30) Foreign Application Priority Data

Nov. 24, 2006 (JP) ................................. 2006-316528

(51) Int. Cl.
*F01N 3/00* (2006.01)
(52) U.S. Cl. .................. 60/285; 60/295; 60/301
(58) Field of Classification Search .................. 60/285, 60/295, 301
See application file for complete search history.

(56) References Cited

U.S. PATENT DOCUMENTS

| | | | |
|---|---|---|---|
| 5,388,403 A | | 2/1995 | Nagami et al. |
| 6,330,796 B1 * | | 12/2001 | Nishimura et al. ............. 60/286 |
| 2004/0016227 A1 | | 1/2004 | Kitahara |

FOREIGN PATENT DOCUMENTS

| | | |
|---|---|---|
| EP | 1619373 A1 | 1/2006 |
| JP | 2005-163591 | 6/2005 |
| JP | 2006-214320 | 8/2006 |
| JP | 2006-299886 | 11/2006 |

OTHER PUBLICATIONS

Japanese Office Action for Application No. 2006-316528, dated Oct. 7, 2008.
European Search Report for Application No. EP07021730, dated Feb. 15, 2005.

* cited by examiner

*Primary Examiner* — Thomas E Denion
*Assistant Examiner* — Diem Tran
(74) *Attorney, Agent, or Firm* — Nelson Mullins Riley & Scarborough LLP; Anthony A. Laurentano

(57) ABSTRACT

An exhaust gas purifying device for an internal combustion engine, comprises: a first catalyst (TWC 7, example) having a reducing capability; a second catalyst (LNC 9, example) provided downstream of the first catalyst, the second catalyst is adapted to trap NOx in a lean condition of air fuel ratio of an exhaust gas and reduce the trapped NOx in a rich condition of air fuel ratio of the exhaust gas; and an exhaust air fuel ratio control means for controlling an exhaust air fuel ratio to decrease the NOx in the first and second catalysts, wherein the exhaust air fuel ratio control means conducts NOx decreasing control suitable for the first catalyst when the second catalyst is in an inactive state and the first catalyst is in an active state, and wherein the exhaust air fuel ratio control means conducts NOx decreasing control suitable for the second catalyst after the second catalyst is activated.

3 Claims, 6 Drawing Sheets

EXHAUST GAS PURIFYING DEVICE FOR AN INTERNAL COMBUSTION ENGINE

TECHNICAL FIELD

The present invention relates to an exhaust gas purifying device for an internal combustion engine that temporarily adsorbs NOx in an exhaust gas of the internal combustion engine and purifies the exhaust gas by reducing the adsorbed NOx.

BACKGROUND OF THE INVENTION

In lean-burn internal combustion engines (diesel engines, for example), a lean NOx catalyst (hereinafter referred to as LNC) may be fitted in an exhaust passage to clean the exhaust gas by reducing NOx (nitrogen oxides) in the exhaust gas. This LNC functions to trap (more specifically, adsorb) NOx when the air fuel ratio of the exhaust gas (referred to as exhaust A/F hereinafter) is higher than a prescribed level (referred to as a "lean" condition hereinafter), and reduce the adsorbed NOx to a harmless form when the exhaust A/F is lower than a prescribed level (referred to as a "rich" condition hereinafter).

The exhaust gas purifying capability of the LNC can change depending on operating conditions of the internal combustion engine and it is known, for example, that a phenomenon called "NOx slip" can sometimes happen in that part of the NOx adsorbed by the LNC is released without being reduced during the reduction process.

In order to avoid such a phenomenon, Japanese Patent Application Publication No. 2006-214320 has proposed an internal combustion engine control that prevents the lean operation when an LNC temperature is below a prescribed temperature and a load of the internal combustion engine is higher than a prescribed value.

On the other hand, because the exhaust gas purifying capability of the LNC tends to diminish as an amount of adsorbed NOx increases, a so-called "rich spike control" is conducted in that the exhaust A/F is made into a rich atmosphere intermittently at appropriate times in order to reduce the NOx adsorbed by the LNC. In this regard, it has been also found that though not as good as the LNC, a three-way catalyst (TWC) also has a similar NOx processing ability.

However, the technique described in JPA Publication No. 2006-214320 needs to conduct stoichiometric (abbreviated to "stoic" hereinafter) operation until the LNC temperature reaches an activation temperature, which is 200° C. or higher, for example, and this is undesirable in view of fuel consumption efficiency.

BRIEF SUMMARY OF THE INVENTION

The present invention is made to solve such prior art problems, and a primary object of the present invention is to provide an improved exhaust gas purifying device for an internal combustion engine that can achieve higher NOx decreasing ability in an inactive state of an LNC.

To achieve such an object, the present invention provides an exhaust gas purifying device for an internal combustion engine, comprising: a first catalyst (TWC 7, for example) having a reducing ability; a second catalyst (LNC 9, for example) provided downstream of the first catalyst, the second catalyst is adapted to trap NOx in a lean condition of air fuel ratio of an exhaust gas and reduce the trapped NOx in a rich condition of air fuel ratio of the exhaust gas; and an exhaust air fuel ratio control means for controlling an exhaust air fuel ratio to decrease the NOx in the first and second catalysts, wherein the exhaust air fuel ratio control means conducts NOx decreasing control suitable for the first catalyst when the second catalyst is in an inactive state and the first catalyst is in an active state, and wherein the exhaust air fuel ratio control means conducts NOx decreasing control suitable for the second catalyst after the second catalyst is activated.

According to such a structure, in an operating state where the second catalyst temperature has not reached the activation temperature and hence the exhaust emission could be deteriorated, a NOx decreasing control suitable for the first catalyst, which is positioned upstream of the second catalyst and hence can reach its activation temperature earlier than the second catalyst, is conducted to effectively decrease NOx.

Preferably, the NOx decreasing control suitable for the first catalyst can be selected from a rich spike control, a continuous stoic control and a weak rich control. Typically, in an operating state where the second catalyst temperature has not reached the activation temperature, a rich spike mode control suitable for the first catalyst is conducted to decrease NOx if the first catalyst temperature has reached the activation temperature and the load is low, and this contributes to economic fuel consumption. On the other hand, if the load is high and the first catalyst cannot adsorb NOx, the exhaust air fuel ratio (A/F) is controlled to be continuously "stoic" or weak rich to reduce NOx into a harmless form. Thus, the present invention is quite effective in achieving both of improvement of exhaust emission quality and favorable fuel economy.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
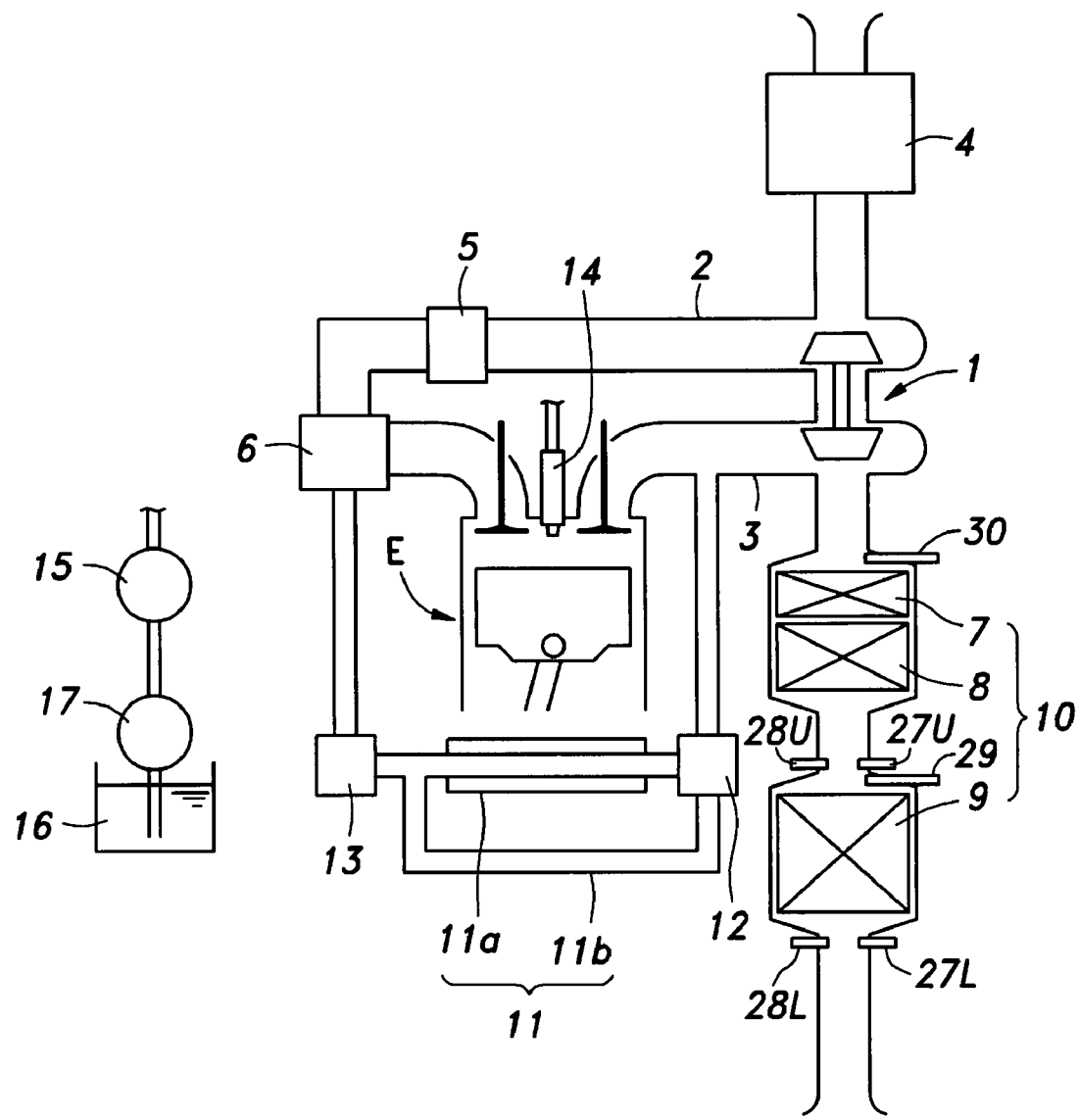
FIG. 1 is an overall structural view of an internal combustion engine to which the present invention is applied.

FIG. 1 is a basic structural view of an internal combustion engine E to which the present invention is applied. The mechanical structure of this internal combustion engine (diesel engine) E is no different from a conventional one, and the engine E comprises a turbocharger 1 equipped with a variable boost pressure mechanism. An intake passage 2 is connected to a compressor side of the turbocharger 1 and an exhaust passage 3 is connected to a turbine side of the turbocharger 1. An air cleaner 4 is connected to an upstream end of the intake passage 2, and an intake control valve 5 for controlling a flow rate of fresh air flowing into a combustion chamber and a swirl control valve 6 for restricting a cross-section of the flow passage to increase the air flow velocity in a low rotational speed/low load operation region are provided at appropriate positions in the intake passage 2. Further, connected on a downstream side of the exhaust passage with respect to the turbocharger 1 is connected an exhaust gas purifying device 10, which comprises: a TWC 7 (first catalyst) for oxidizing HC and CO as well as reducing NOx in the exhaust gas under a "stoic" atmosphere; a filter (DPF) 8 for removing particulate matter (PM) such as soot; and an LNC 9 (second catalyst) for trapping (more specifically, adsorbing) NOx in the exhaust gas when the oxygen level is high ("lean" condition) and reducing the adsorbed NOx when the oxygen level is low ("rich" condition), where the TWC 7, filter 8 and LNC 9 are arranged in this order from upstream along the flow of exhaust gas.

The swirl control valve 6 and a part of the exhaust passage 3 near the exit of the combustion chamber are connected to each other via an exhaust gas recirculating (hereinafter referred to as EGR) passage 11. This EGR passage 11 comprises a cooler passage 11a and a bypass passage 11b which are bifurcated at a switching valve 12, and an EGR control valve 13 is provided at a junction of the passages 11a and 11b for controlling an EGR flow rate toward the combustion chamber.

A fuel injection valve 14 is provided to a cylinder head of the internal combustion engine E such that an end of the fuel injection valve 14 extends into the combustion chamber. The fuel injection valve 14 is connected to a common rail 15 containing fuel at a prescribed high pressure, and the common rail 15 is connected to a fuel pump 17 driven by a crankshaft to pump up fuel from a fuel tank 16.

Figure 2:
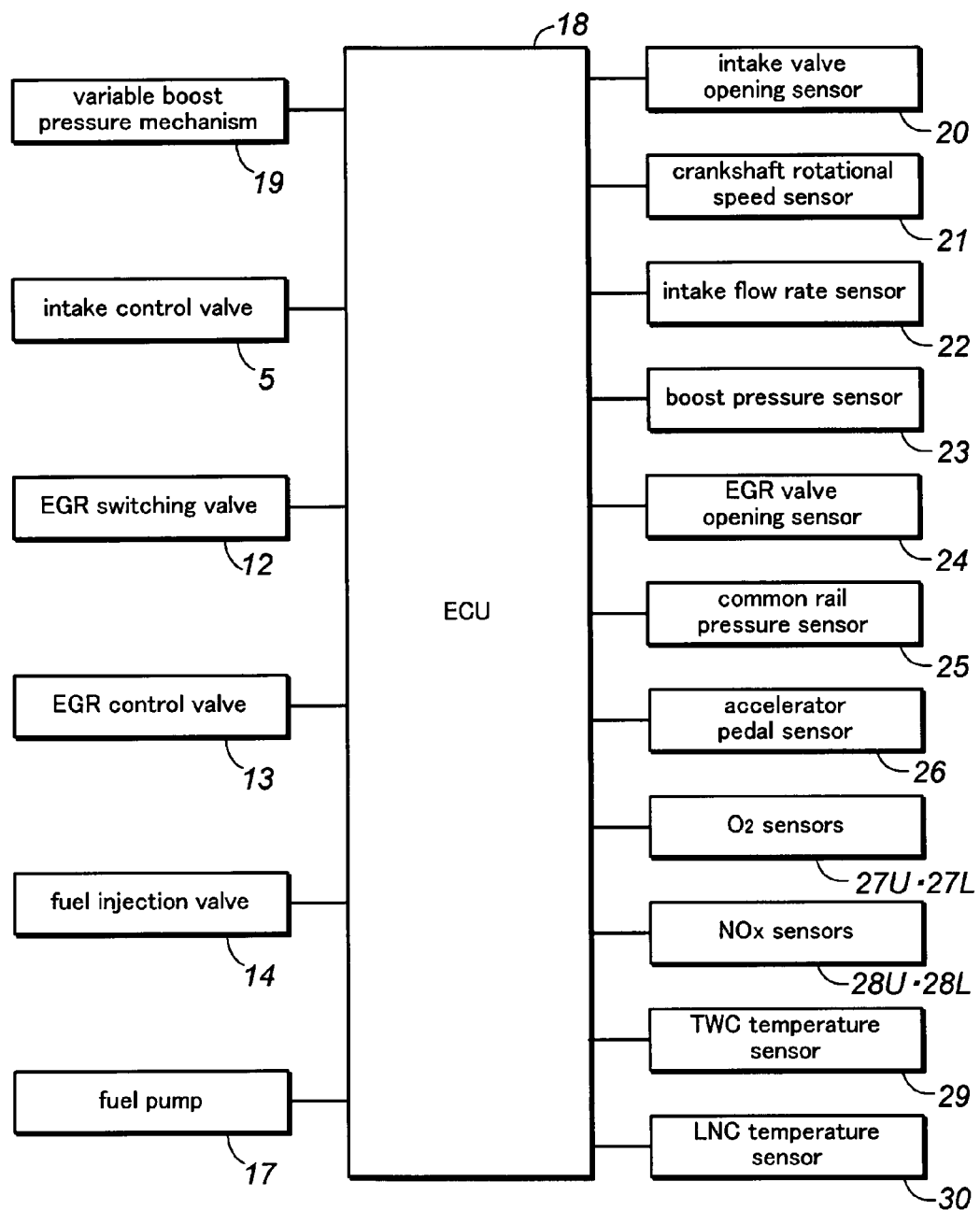
FIG. 2 is a block diagram of a control device to which the present invention is applied.

The variable boost pressure mechanism 19 for the turbocharger 1, the intake control valve 5, EGR passage switching valve 12, EGR control valve 13, fuel injection valve 14, fuel pump 17 and so on are configured to operate according to control signals from an electronic control unit (ECU) 18 (see FIG. 2).

As shown in FIG. 2, the ECU 18 in turn receives signals from an intake valve opening sensor 20, crankshaft rotational speed sensor 21, intake flow rate sensor 22, boost pressure sensor 23, EGR valve opening sensor 24, common rail pressure sensor 25, accelerator pedal sensor 26, $O_2$ sensors 27U and 27L, NOx sensors 28U and 28L, TWC temperature sensor 29, LNC temperature sensor 30 and so on which are provided in appropriate parts of the internal combustion engine E.

A memory for ECU 18 stores a map setting target values of various controlled quantities such as optimum fuel injection obtained beforehand with respect to crankshaft rotational speed and torque demand (accelerator pedal displacement) which is typically determined experimentally so that the various control quantities may be optimally controlled and an optimum combustion state may be achieved under all load conditions of the internal combustion engine E.

Figure 3:
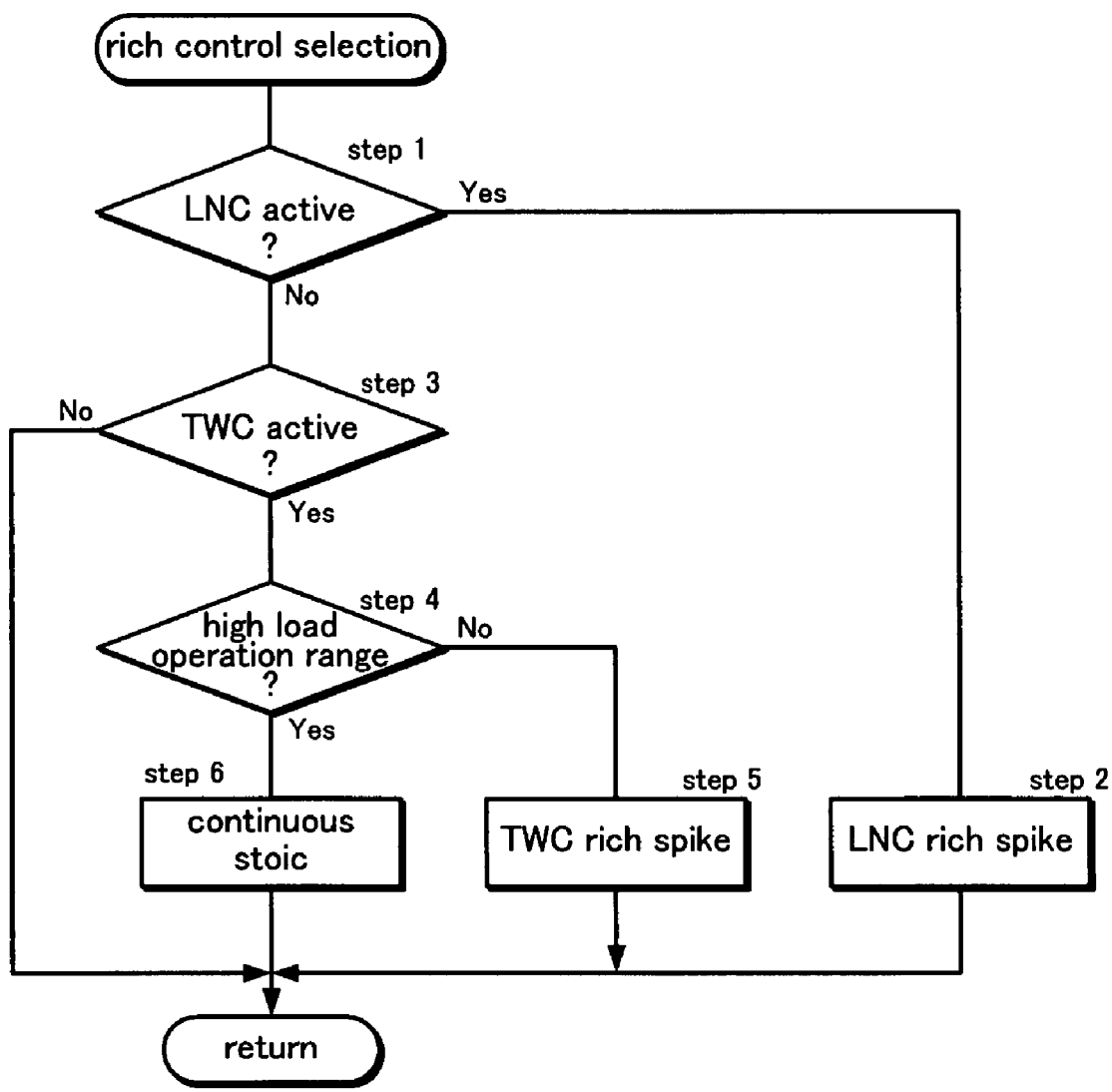
FIG. 3 is a flowchart regarding mode switching control.

Next, with reference to FIG. 3, an explanation is made to selection control of a rich spike mode. First of all, an LNC temperature is detected and a judgment is made on whether or not the temperature has reached a prescribed activation temperature which is 150-200° C., for example (step 1). When it is determined that the LNC temperature has reached the activation temperature ("Yes" in step 1), a rich spike mode suitable for the LNC 9 is conducted (step 2).

When it is found that the LNC temperature has not reached the activation temperature ("No" in step 1), a judgment is made on whether or not the TWC 7 has reached a prescribed activation temperature, which is 200° C., for example (step 3). When it is found that the TWC 7 has not reached the activation temperature ("No" in step 3), it is judged that a condition for conducting the rich spike mode has not established, and the first cycle of the process is ended.

When it is found in step 3 that the TWC 7 has reached the activation temperature ("Yes" in step 3), a search is made in a load determination map (not shown in the drawings) set with respect to the crankshaft rotational speed and torque demand, and a judgment is made on whether the current state is in a prescribed high load region (step 4). If it is found that the load is below a prescribed value ("No" in step 4), a rich spike mode suitable for TWC 7 is conducted (step 5), while if it is found that the load is greater than the prescribed value ("Yes" in step 4), a continuous stoichiometric mode (stoic mode) or a weak rich mode is conducted (step 6).

Figure 4:
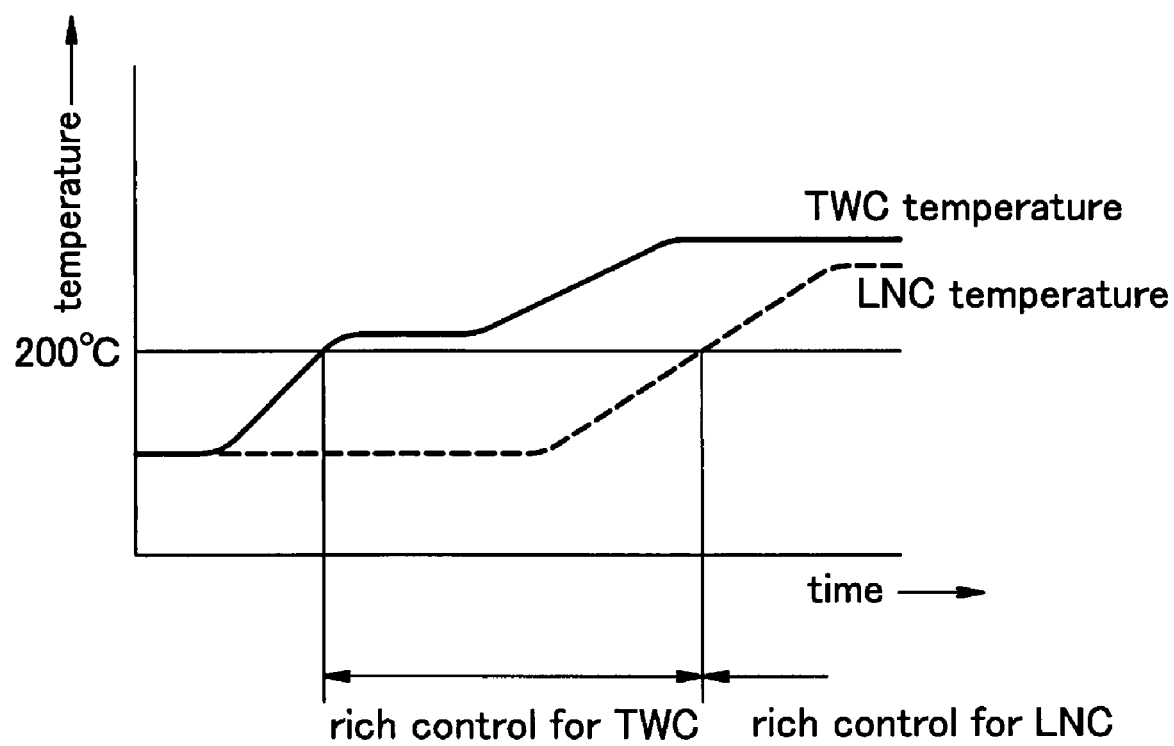
FIG. 4 is a graph schematically showing the mode switch timing.

Because the TWC 7 is disposed more upstream of the exhaust passage or closer to the combustion chamber than the LNC 9, the temperature of the TWC 7 rises faster than the LNC 9. FIG. 4 shows such a situation in a time sequence. As shown, when the TWC reaches the activation temperature, the rich control suitable for the TWC 7 is conducted until the LNC 9 reaches the activation temperature, and when the LNC 9 reaches the activation temperature, the rich control suitable for the LNC 9 is conducted.

Figure 5:
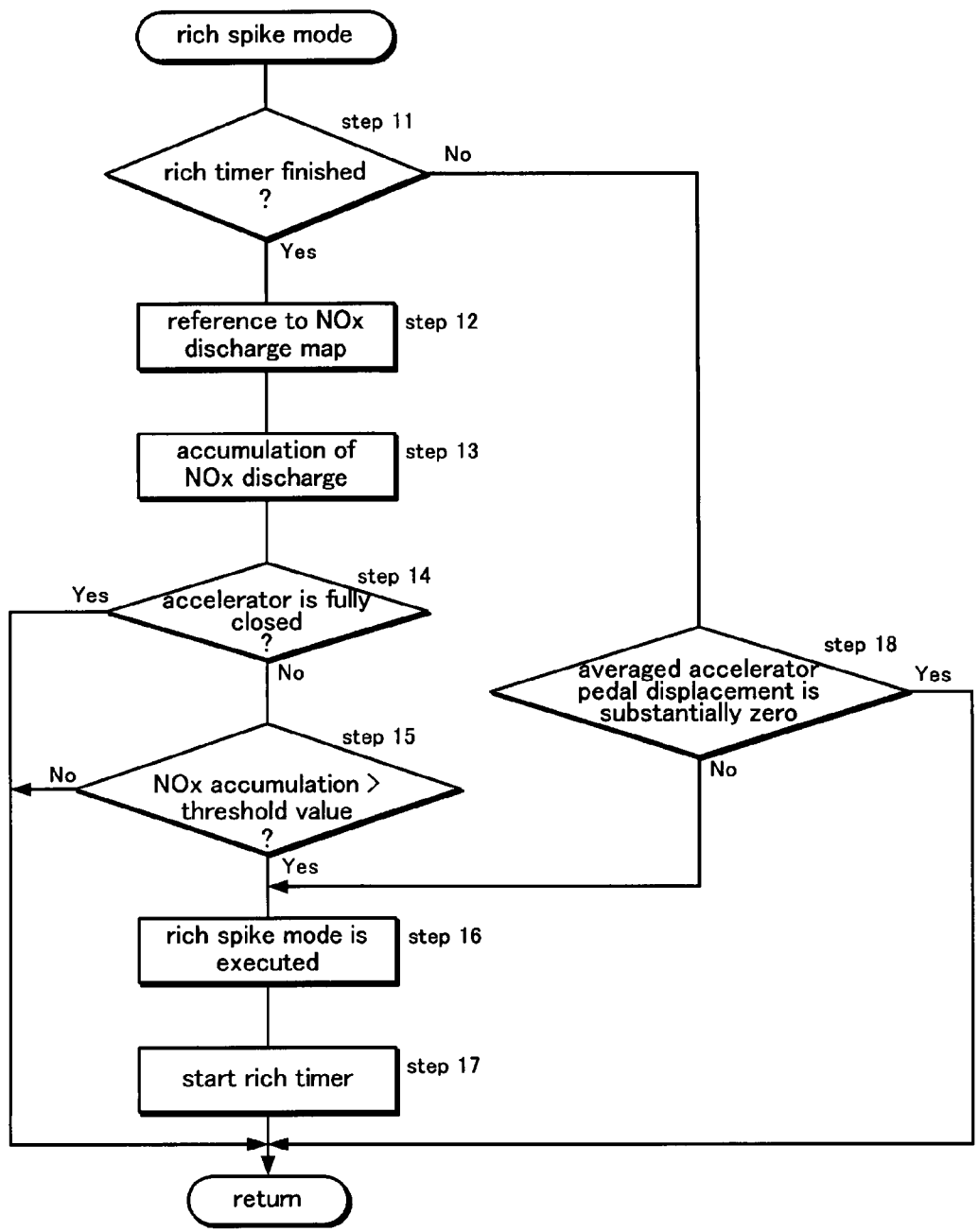
FIG. 5 is a flowchart regarding rich spike control.

Next, an explanation is made to the control in the rich spike mode with respect to FIG. 5. The rich spike mode is for releasing and reducing NOx adsorbed by TWC 7 or LNC 9 during the lean combustion operation, and conducted in response to an increase in the amount of fuel injection (main injection and post injection) or decrease in an amount of air intake in the fuel injection valve 14, which can result from the control of turbocharger 1, intake control valve 5, swirl control valve 6 and/or EGR control valve 13.

First, a judgment is made on whether a "rich" timer for counting an execution time of the rich spike mode has finished time counting (i.e., the timer indicates count 0) or not (step 11). When the count value of the rich timer is zero, in other words, when it is determined that the rich spike mode has finished ("Yes" in step 11), a search is made in a NOx discharge map (not shown in the drawings) which is adapted to be accessed by using the crankshaft rotational speed and the torque demand as an address, and NOx discharge corresponding to the current operation state is computed (step 12). This map is adapted to provide a higher value for a higher crankshaft rotational speed and for a higher torque demand.

Then, the NOx discharge obtained in step 12 is added to a previously obtained NOx discharge accumulation to calculate an updated (current) NOx discharge accumulation (step 13). The NOx discharge accumulation indicates a total amount of NOx adsorbed by the TWC 7 or the LNC 9.

Subsequently, a judgment is made on whether the displacement of the accelerator pedal is zero (fully closed) or not (step 14). If it is found that the accelerator pedal is not being stepped on, i.e., the current state is in a deceleration or idling ("Yes" in step 14), it is considered that the condition for conducting the rich spike mode has not established, and the first cycle of the process is ended. When it is found in step 14 that the accelerator pedal is being stepped on ("No" in step 14), then a judgment is made on whether the NOx discharge accumulation obtained in step 13 exceeds a prescribed threshold value or not (step 15).

Figure 6:
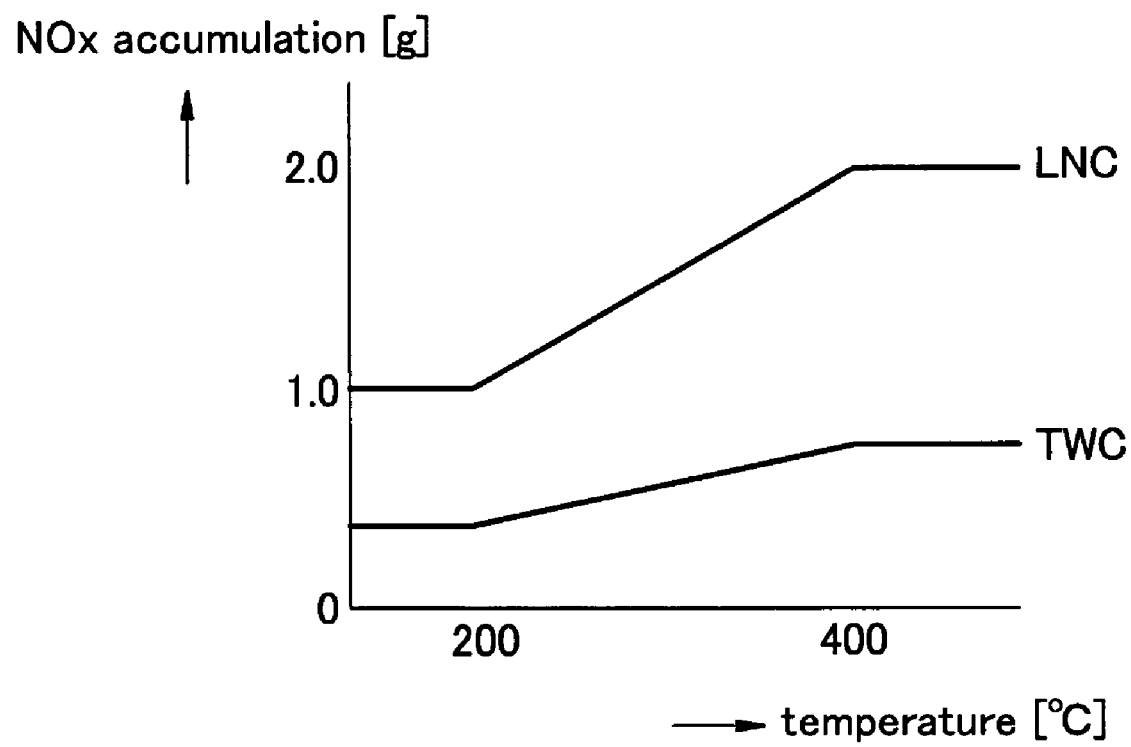
FIG. 6 is an explanatory view regarding a judgment value for rich spike control performing region.

This threshold value is set for both of TWC 7 and LNC 9, and can be obtained by searching a table configured with respect to the temperature of each catalyst. As shown in FIG. 6, the threshold value provided by the table is set at a first judgment value for the catalyst temperature below a first prescribed temperature (200° C., for example), set at a second judgment value, which is higher than the first judgment value, for the catalyst temperature higher than a second prescribed temperature, and set at a value on a straight line connecting the first and second judgment values for the catalyst temperature between the first and second prescribed temperatures. This is intended to cope with the tendency that the lower the temperature of TWC 7 or LNC 9 is or the more the amount of adsorption of NOx is, the reduction rate of NOx decreases due to NOx slip.

When it is determined that the NOx discharge accumulation is below the prescribed threshold value ("No" in step 15), it is considered that the amount of adsorption of NOx is not enough and the condition for conducting the rich spike mode has not established, and the first cycle of the process is ended.

On the other hand, when it is determined that the NOx discharge accumulation exceeds the prescribed threshold value ("Yes" in step 15), the rich spike mode is conducted (step 16) and the NOx discharge accumulation is reset to zero. At the same time, the rich timer for counting back from a prescribed execution time of rich spike mode (5 sec, for example) is set to start, and the first cycle of the process is ended.

When it is determined in step 1 that the counting of the rich timer has not finished counting ("No" in step 1), in other words, when the rich spike mode is still being conducted, an averaged value of the accelerator pedal displacement is computed and a judgment is made on whether the averaged displacement is substantially zero or not (step 18). When it is determined that the averaged value of accelerator pedal displacement is substantially zero ("No" in step 18), it is considered that the accelerator pedal has been released during the execution of rich spike mode, and thus the rich spike mode operation is terminated. When it is determined that the averaged value of accelerator pedal displacement is not substantially zero ("Yes" in step 18), the rich spike mode operation is continued.

As described above, when the LNC 9 is inactive and the TWC 7 is active, the rich spike mode, the continuous stoic mode or the weak rich mode is selectively conducted depending on the operational load, and this can allow efficient NOx purification (or decrease) to be achieved by using the TWC 7 even though the LNC 9 is inactive without deteriorating fuel consumption efficiency.

Although the present invention has been described in terms of preferred embodiments thereof, it is obvious to a person skilled in the art that various alterations and modifications are possible without departing from the scope of the present invention which is set forth in the appended claims.

The disclosure of the original Japanese patent application (Japanese Patent Application No. 2006-316528 filed on Nov. 24, 2006) on which the Paris Convention priority claim is made for the present application is hereby incorporated by reference in its entirety.

The invention claimed is:

1. An exhaust gas purifying device for an internal combustion engine, comprising:
   a three-way catalyst having a reducing capability;
   a lean NOx catalyst provided downstream of the three-way catalyst, the lean NOx catalyst is adapted to trap NOx in a lean condition of air fuel ratio of an exhaust gas and reduce the trapped NOx in a rich condition of air fuel ratio of the exhaust gas; and
   an exhaust air fuel ratio control means for controlling an exhaust air fuel ratio to remove the NOx from the three-way and lean NOx catalysts,
   wherein, when the lean NOx catalyst is in an inactive state and the three-way catalyst is in an active state, the exhaust air fuel ratio control means conducts a lean control or a rich spike control in a selective manner depending on a prescribed operating condition under a low-load operating condition of the engine, and a continuous stoichiometric control or a weak rich control under a high-load operating condition of the engine.

2. The exhaust gas purifying device according to claim 1, wherein the rich spike control is conducted when a state of an accelerator pedal does not correspond to a decelerating or idling state of the vehicle.

3. The exhaust gas purifying device according to claim 1, wherein the rich spike control is conducted when a NOx discharge accumulation exceeds a prescribed value.

* * * * *